July 19, 1949.   R. B. PETTIBONE   2,476,763
HYDRAULIC MOTOR CONTROL CIRCUIT
Filed Feb. 24, 1947

INVENTOR.
RAYMOND B. PETTIBONE
BY
Ralph L. Tweedale

Patented July 19, 1949

2,476,763

UNITED STATES PATENT OFFICE 2,476,763

HYDRAULIC MOTOR CONTROL CIRCUIT

Raymond B. Pettibone, Detroit, Mich., assignor to Vickers Incorporated, Detroit, Mich., a corporation of Michigan Application February 24, 1947, Serial No. 730,489

9 Claims. (Cl. 60—52)

This invention relates to power transmissions, particularly to those of the type comprising two or more fluid pressure energy translating devices, one of which may function as a pump and another as a fluid motor.

This invention is more particularly concerned with a power transmission system of the type containing a fluid pump and a fluid motor and incorporating whtt is commonly known as a flow regulating valve for controlling the speed of the motor. The flow regulating valve contains in series therein an adjustable throttle and a compensating valve responsive to the pressure drop across the throttle for maintaining a uniformly constant regulated flow of fluid across the throttle regardless of load resistance on the motor.

Flow regulating valves of this type have an important use in hydraulic power transmissions for driving machine tools. They serve the purpose of producing a reduced rate of a machine tool and the machine tool may be driven at a constantly regulated rate of speed regardless of motor load resistance.

In the past, some difficulty was presented in preventing "motor jump" when a machine tool slide was moved into a feed position from rest or where there was a resumption of a feed movement after interruption thereof during a slide movement. In many cases, if a feed movement was interrupted and the operator of the machine tool did not back the tool away from the work before resuming a cut, the tool was ruined.

The motor jump mentioned is due to the fact that the compensating valve is biased to a fully open position by a compensating valve spring when flow through the flow regulating valve is interrupted. When flow is resumed after interruption, a temporary flow of fluid above the normal regulated rate passes through the fully open compensating valve before it is able to assume one of a numerous normal regulating positions. Although this is only a momentary lapse and the compensating valve almost immediately assumes a normal regulating position, this temporary flow of fluid above the normal regulating rate causes the motor to jump slightly before a constantly regulated movement of the motor begins.

In addition to the failure of the compensating valve to immediately assume a normal regulating position when flow is resumed through the same after interruption, there are other factors contributing to motor jump. It has been discovered that these factors are (a) loss of fluid over the throttle, (b) displacement of fluid from the compensating valve in shifting from the fully open position to a regulating position, (c) a slight compressability of fluid, (d) compression of packing or seals, (e) leakage of fluid, (f) slight expansion of the cylinder motor and tubing, (g) compression of small quantities of entrapped air.

It is therefore an object of this invention to provide an improved hydraulic power transmission system which will overcome motor-jump.

It is a further object to provide in a hydraulic power transmission system having a fluid pump and motor and a flow regulating valve for controlling the speed of the motor, a fluid ejection cylinder for injecting a flow of fluid through the flow regulating valve prior to restarting the motor after interruption.

It is also an object of this invention to connect, in such a hydraulic system, the fluid ejection cylinder mentioned above in such a manner that the contributing factors of motor-jump may be eliminated.

Further objects and advantages of the present invention will be apparent from the following description, reference being had to the accompanying drawing wherein a preferred form of the present invention is clearly shown.

Figures 1, 2:
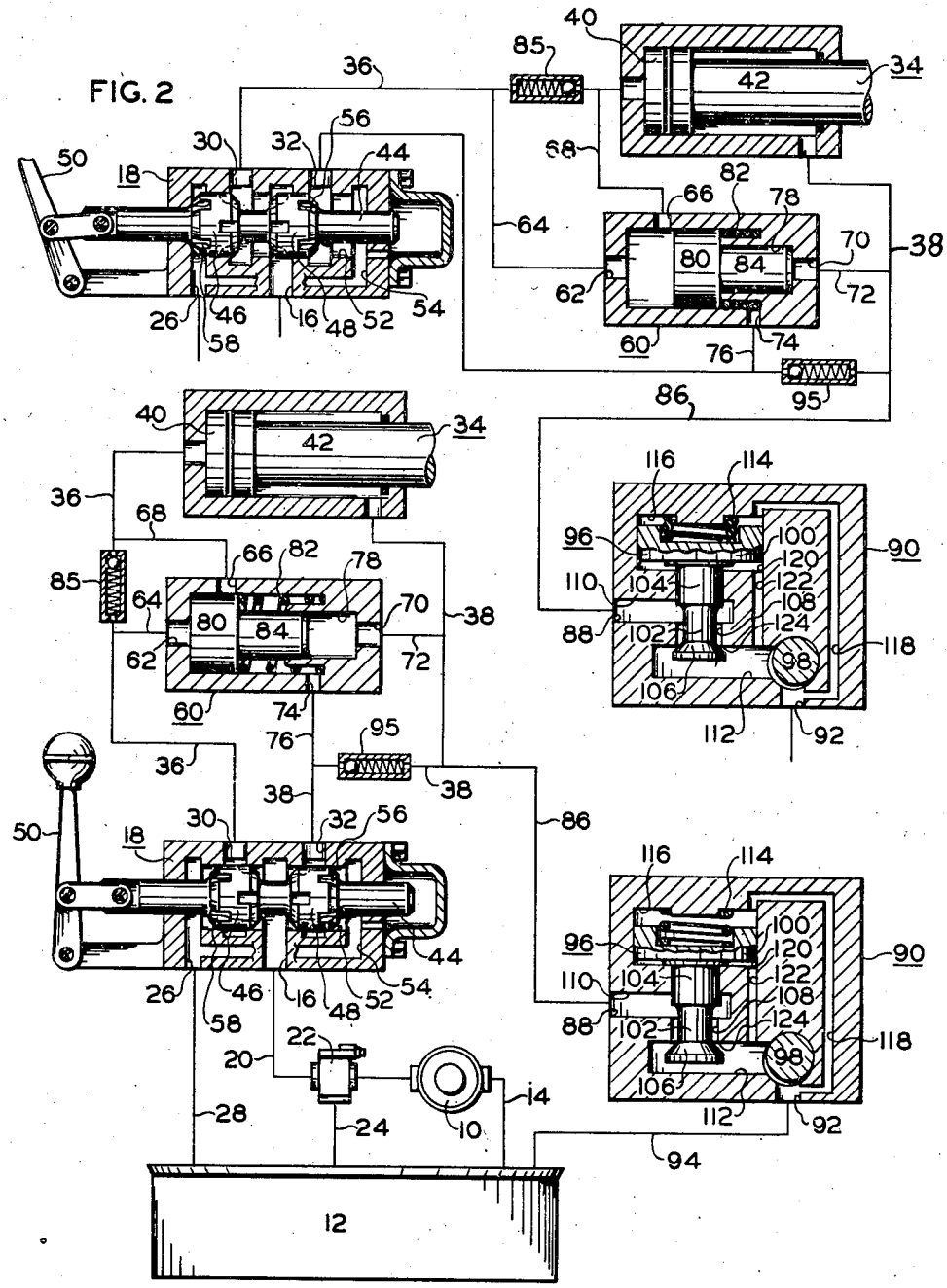
Figure 1 is a diagrammatic view of a power transmission system incorporating a preferred form of the present invention.
Figure 2 is a partial diagrammatic view of the same hydraulic power transmission system shown in Figure 1, but showing the parts thereof in another position during operation.

Referring now to Figure 1, there is shown a fluid pump 10, which may be driven by an electric motor, not shown, which is connected to a tank 12 by means of a suction conduit 14 and which is connected to a pressure port 16 of a four-way directional valve 18 by means of a pump delivery conduit 20. Incorporated in the pump delivery conduit 20 is a suitable relief valve 22 which will relieve to tank 12 by means of an exhaust conduit 24, excessive pressure fluid in the system whenever the setting of the valve 22 is exceeded. The control valve 18 also has a tank port 26 connected to the tank 12 by means of a conduit 28 and a pair of operating ports 30 and 32 which are respectively connected to opposite ends of a fluid motor 34 by means of conduits 36 and 38. The motor 34 is provided with a piston 40 reciprocably mounted therein to which is connected a piston rod 42 extending through the motor.

The control valve 18 is provided with a valve spool 44 having spaced apart lands 46 and 48, said spool being manually operable by means of a hand lever 50. The external connection ports of the valve 18 are connected directly to a valve bore 52 within which the valve spool 44 is reciprocable. The opposite ends of the bore 52 are connected to each other by means of a branched passage 54, the latter of which is connected also to the tank port 26. The lands 46 and 48 of the valve spool 44 are each provided with a plurality of notches 56 and 58. The control valve 18 is of the open center type which, in the position shown, connects the pressure port 16 and the operating ports 30 and 32 to the tank port 26 by means of the notches 56 and 58. With the valve spool 44 shifted rightwardly, pressure port 16 is connected to operating port 32 and the operating port 30 is connected to the tank port 26. When the valve spool 44 is shifted leftwardly, as shown in Figure 2, the pressure port 16 is connected to the operating port 30 and the operating port 32 is connected to the tank port 26.

Located between the directional control valve 18 and the motor 34 is a fluid ejection cylinder 60 having an inlet port 62 connected to the conduit 36 by means of a branch conduit 64, an outlet port 66 also connected to the conduit 36 by means of a branch conduit 68 and a fluid ejection port 70 connected to the conduit 38 by means of a conduit 72. The ejection cylinder 60 is also provided with a drain port 74 which is connected to the conduit 38 by means of a conduit 76. The cylinder 60 is provided with a stepped longitudinal bore 78 extending completely therethrough within which is reciprocably mounted a piston 80 biased to the position shown by means of a spring 82 of slight resistance. The piston 80 has a projection 84 of smaller area which is shiftable within the smaller portion of the bore 78. In the position shown, the piston 80 blocks the inlet port 62 from the outlet port 66, but when shifted rightwardly a sufficient distance opens communication between said ports. As the piston 80 is shifted rightwardly in response to pressure increases at the inlet port 62, fluid is ejected from the right end of the bore 78 through the ejection port 70 by means of the projection 84.

A check valve 85 is incorporated in conduit 36 between the points of intersection of the branch passages 64 and 68 with conduit 36 which prevents flow in conduit 36 to the motor 34 except through port 66 of the ejection cylinder 60, but which permits flow from the piston end of the motor 34 to the tank 12 when the motor 34 is operated in a leftward directional movement.

A branch conduit 86 connects the conduit 38 to an inlet port 88 of a flow regulating valve 90 also having an outlet port 92 which is connected to the tank 12 by means of a conduit 94. A check valve 95 is incorporated in the conduit 38 which directs fluid discharging from the right end of the motor 34 to the regulating valve 90. The check valve 95 permits flow from the pump 10 to the right end of the motor 34 when it is desired to operate the motor in a leftward directional movement.

The flow regulating valve 90 contains a compensating valve 96 and in series therewith an adjustable throttle 98. The compensating valve 96 comprises a piston 100 to which is connected a stem 102 having an upper land 104 and a tapered lower land forming a control valve 106. The valve 106 controls the flow of fluid from an inlet chamber 108 to the outlet port 92. The inlet chamber 108 is connected to the inlet port 88 by means of an inlet passage 110 and is connected to the outlet port 92 by means of an outlet passage 112. The throttle 98 is located in the passage 112.

The piston 100 is biased downwardly by means of a spring 114 of predetermined resistance located in a chamber 116 located above the piston 100. Chamber 116 is connected to the outlet passage 112 beyond the throttle 98 by means of a passage 118. A chamber 120 located beneath the piston 100 is connected to the outlet passage 112 ahead of the throttle 98 by means of a passage 122. A seat 124 is formed at the lower end of the inlet chamber 108 which opens to the passage 112 and which is controlled by valve 106.

The purpose of the flow regulating valve 90 is to regulate the flow of fluid discharging from the rod end of motor 34 when the latter is operated in a rightward directional movement thereby causing a controlled speed movement of said motor. The throttle 98 is adapted to be originally adjusted for passing a predetermined amount of fluid and it is the function of the compensating valve 96 to maintain a constant pressure drop across the throttle 98 thereby maintaining the flow across the throttle uniformly constant. The compensating valve 96 performs the aforementioned function by being responsive to the pressure drop across the throttle 98. While fluid is discharging from the rod end of the motor 34 through the flow regulating valve 90, any increase or decrease in pressure in passage 112 ahead of the throttle 98 is immediately present in the chamber 120 of the compensating valve 96 to respectively shift the piston upwardly or downwardly thereby respectively permitting the valve 106 to close or open the seat 124 more fully. Any increase or decrease of pressure in passage 112 beyond the throttle 98 is immediately present in the upper chamber 116 of the compensating valve 96 to make said valve truly responsive to the pressure drop across the throttle 98. The resistance of the spring 114 will determine the amount of the pressure drop across the throttle 98.

It should be noted that when compensating valve 96 is in a normal regulating position that the valve 106 normally will never fully open or fully close the seat 124. However, when the motor 34 is stopped, fluid flow through the flow regulating valve 90 ceases and the spring 114 will bias the piston 100 downwardly so that valve 106 fully opens the seat 104. Consequently, if the motor 34 were started in a rightward directional movement from rest or a rightward movement of the motor was resumed after interruption, and the valve 106 was in a position fully opening the seat 124 or in a non-regulating position, a temporary flow of fluid above the normal regulated rate would pass through the throttle 98 before the valve 106 shifted with the piston 100 to a regulating position.

Thus, it is the function of the fluid ejection cylinder 60 to inject a flow of fluid through the flow regulating valve 90 so as to place the compensating valve 96 in a normal regulating position when the motor is started from rest or restarted after interruption in a rightward movement.

It is also the function of the fluid ejection cylinder to completely fill and compress the rod end of the motor side of the transmission with fluid under an operating pressure equivalent to the operating pressure therein when the motor is being operated in a rightward directional movement.

As will hereinafter be described, means are provided which insures the complete performance of these functions before a rightward directional movement of the motor is begun or before the resumption of such a movement after interruption. The terminology "inject a flow of fluid" and "injecting a flow of fluid" is hereinafter utilized to define a type of fluid flow of limited volume which is initiated, continued until the needs of the system are fulfilled and then terminated, as distinguished from a continuous type of fluid flow.

Referring now to Figure 1, in operation, with control valve 18 in the position shown, the pressure port 16 thereof is connected directly to the tank port 26 and the full delivery from the pump will be unloaded at negligible pressure to the tank 12. The inlet port 62 of the ejection cylinder 60 is also connected to the tank 12 by means of conduit 36, the ports 30 and 26 of control valve 18, and conduit 28 thereby permitting the return spring 82 of the cylinder 60 to shift the piston 80 to the leftward position shown. The control valve 106 of compensating valve 96 will be in the position shown, i. e., the fully open position, because flow through the flow regulating valve 90 has ceased.

If it is desired to start the motor 34 in a rightward directional movement, the handle 50 of the control valve 18 is shifted leftwardly to place the valve spool 44 in the position shown in Figure 2. In this position of the spool 44, the pressure port 16 is connected to the operating port 30 and the operating port 32 is connected to the tank port 26. Pressure fluid from pump 10 will then be delivered by means of conduit 20, control valve 18, conduit 36, and branch conduit 64 to the inlet port 62 of cylinder 60. The check valve 85 blocks the flow of pressure fluid in conduit 36 to the piston end of the motor 34. As piston 80 of the cylinder 60 shifts rightwardly against the slight resistance offered by the spring 82, fluid from the right end of the bore 78 is ejected through the outlet port 70 by the projection 84 from where it is conducted by means of conduits 72, 38, and 86 to the flow regulating valve 90. The check valve 95 prevents flow from the cylinder 60 to the control valve 18. The fluid ejected from the cylinder 60 is directed to the inlet port 88 of the flow regulating valve 90 and by means of inlet passage 110, inlet chamber 108, seat 124, outlet passage 112, throttle 98, outlet port 92, and conduit 94 to the tank 12. As the throttle 98 has been adjusted to pass a predetermined amount of fluid less than what is being ejected from the cylinder 60, there is an almost immediate pressure increase in passage 112 ahead of the throttle 98 which is immediately present in chamber 120 to shift the piston 100 upwardly. As the piston 100 shifts upwardly, the valve 106 will shift upwardly therewith to cause a restricted opening of the seat 124 and cause the admittance of less fluid to passage 112. This is a result of an almost immediate pressure increase in the inlet chamber 108, which increase is also present in the pump delivery conduit 20. This increase of pressure in the pump delivery conduit 20 causes the relief valve 22 to operate and relieve to the tank 12 by means of exhaust conduit 24 all excessive fluid delivered by the pump 10 in excess of what is delivered to the ejection cylinder 60.

As the flow of fluid ejected from the cylinder 60 continues to be injected through the flow regulating valve 90, the compensating valve 96 will maintain the pressure drop across the throttle 98 uniformly constant and thus maintain the flow through the throttle 98 at a normal regulated rate.

It should be noted that when the compensating valve 96 assumes a regulating position that a resistance to continued flow from the rejection cylinder 60 is created which diverts a portion of said flow under pressure to the rod end of the motor. This will cause substantially the same degree of compression of fluid packing and seals and entrapped air and substantially the same expansion of tubing and the motor to occur as if the motor was being operated in a rightward directional movement. Consequently, if the motor is now started in a rightward directional movement, the compensating valve 90 will be in a regulating position and the normal compression and expansion of the system having already occurred, the motor will be immediately controlled in its movement.

Means for insuring that the functions of the ejection cylinder 60 will already have been performed before it is possible for the motor 34 to begin its rightward movement is provided by blocking fluid flow to the piston end of the motor until these functions have been performed. Although other means, such as a separate sequence valve, which may be manually, mechanically, or hydraulically actuated, may be used to assure the proper sequence of operation, it may be efficiently and economically performed by constructing the fluid ejection cylinder 60 as shown in Figures 1 and 2.

When the piston 80 has shifted rightwardly, a sufficient distance to open communication between the inlet port 62 and the outlet port 66, said piston will continue to shift rightwardly and thereby cause a continuous ejection of fluid from the outlet port 70 of the cylinder 60. This is because the ratio of the effective surface area differential between the piston 80 and the projection 84 has been so determined that it is slightly greater than the ratio of the effective surface area differential between the full surface area of the motor piston 40 and the piston surface area 40 minus the piston rod 42 surface area. For instance, if the surface area of the piston and the piston minus rod area is of a 2:1 ratio, the ratio between the piston and projection end of the cylinder 60 may be a ratio of 2.05:1. Consequently, when the inlet port 62 is opened to the outlet port 66 to cause the same pressure to be present at the piston end of the motor as is present at the piston end of the cylinder 60, it also should be noted that the same pressure at the piston rod end of the motor is also present at the projection end of the cylinder. As the effective surface area differential at opposite ends of the motor and cylinder are in favor of the cylinder 60, it follows that the piston 80 must move completely rightwardly before the piston 40 of motor 34 begins to shift rightwardly.

When the piston 80 and projection 84 of cylinder 60 has shifted completely rightwardly, the piston 40 of the motor 34 immediately begins to shift and the discharging fluid from the rod end of the motor will be immediately regulated by the flow regulating valve 90 because the compensating valve 96 is already in a normal regulating position. Fluid discharging from the rod end of the motor 34 is prevented from flowing to the control valve 18 by the check valve 95 and is directed by means of conduits 38 and 86 to the flow regulating valve 90 which will operate in a normal manner to control the speed of the motor 34.

If, during a right directional movement of motor 34 it is desired to stop the same and then resume the rightward directional movement, the operation will be as follows. The motor 34 is stopped by manually shifting the valve spool 44 to the position shown in Figure 1. The inlet port 62 of the cylinder 60 will now be connected to the tank 12 by means of the control valve 18 and the spring 82 will return the piston 80 of the cylinder 60 to the position shown in Figure 1. When the valve spool 44 is shifted to the position shown in Figure 2, the fluid ejection cylinder is again ready for operation to place the compensating valve 96 in a flow regulating position.

It should be noted that if the differential area ratios between the piston and piston rod ends of the motor and the piston and projection ends of the ejection cylinder are not held within close tolerances that a slight backup of the motor piston will occur as the piston 80 of the cylinder 60 is shifted rightwardly.

For instance, if the motor differential area is 2:1 and the ejection cylinder differential area is 3:1, the resultant pressure increases at the rod end of the motor 34 will cause a pressure increase at the piston end of the motor sufficient to overcome the pressure at the inlet side of the check valve 85. Thus, a portion of the fluid ejected by the cylinder 60 would be injected through the flow regulating valve 90 and another portion thereof would shift the piston 40 of motor 34 leftwardly. The fluid discharged from the piston end of the motor 34 would combine with the flow from pump 10 to shift piston 80 of cylinder 60 rightwardly until complete rightward movement thereof had taken place at which time piston 40 of motor 34 would immediately resume its rightward directional movement.

In a vast majority of cases "back-up" of the motor piston, before resuming a rightward directional movement, is not objectionable providing that the objective of the invention, i. e., prevention of motor jump is obtained. The amount of back-up of the motor piston may be clearly seen to depend upon the size of the ejection cylinder and the differential areas involved. Thus, the greater the size of the ejection cylinder, the greater the displacement of the cylinder and consequently a greater back-up of the motor will result.

By intentionally making the differential area between the piston and projection end of the ejection cylinder just slightly more than the differential area between the piston and rod end of the motor and calculating the ratio between the frictional resistance of the motor and the fluid ejection cylinder, back-up of the motor piston may be absolutely prevented. Providing that the frictional resistance of the motor is greater than that of the ejection cylinder, by holding the differential areas to close tolerances the pressure existing at the piston end of the motor will be slightly less than the pressure existing at the piston end of the ejection cylinder so that the check valve 85 will remain closed.

If it is desired to operate the motor 34 in a leftward directional movement, the valve spool 44 is shifted completely to the right (not shown) and the pressure port 16 will now be connected to the operating port 32 and the operating port 30 will be connected to the tank port 26. Pressure fluid from the pump 10 will be directed to the rod end of the motor 34 by means of pump delivery conduit 20, control valve 18, and conduit 38. The check valve 95 permits free flow in the conduit 38 to the rod end of the motor 34. The complete delivery of pump 10 minus the amount bypassed through the flow regulating valve 90 is delivered to the rod end of the motor to produce a leftward directional movement of the piston 40 therein. Fluid discharged from the piston end of the motor is free to flow to the tank 12 by means of conduit 36 through check valve 85, through the control valve 18 by means of operating port 30 and tank port 26 thereof, and conduit 28. Thus, the leftward directional movement of the motor is uncontrolled by the flow regulating valve 90.

It should be noted that the fluid ejection cylinder is an economical means of preventing motor jump by injecting a flow of fluid through the flow regulating valve to place the compensating valve thereof in a regulating position prior to starting the motor in a controlled speed movement or upon resuming the controlled speed movement thereof after interruption.

It should also be noted that fluid ejected from the cylinder not only passes through the flow regulating valve but is an efficient means of eliminating the factors contributing to motor jump. By completely filling conduits 38 and 86 and the rod end of motor 34 with fluid under pressure, the factors of leakage, compression of seals and packing, expansion of the cylinder motor and tubing, slight compressability of fluid, compression of entrapped air, loss of fluid over the throttle, and displacement of fluid from the compensating valve in shifting from the fully open position to a regulating position, are all eliminated.

While the form of embodiment of the invention as herein disclosed constitutes a preferred form, it is to be understood that other forms might be adopted, all coming within the scope of the claims which follow.

What is claimed is as follows:

1. In a hydraulic power transmission system the combination of a fluid pump, a fluid motor, a flow regulating valve for controlling the speed of the motor comprising an adjustable throttle and a pressure compensating valve responsive to the pressure drop across the throttle for maintaining a regulated flow of fluid through the flow regulating valve, said compensating valve being of the type that is biased to the open position when flow through the flow regulating valve ceases, means for stopping and restarting the motor, fluid flow through the flow regulating valve being interrupted when the motor is stopped, and means injecting a flow of pressure fluid through the flow regulating valve before the motor is restarted after stopping the same.

2. In a hydraulic power transmission system the combination of a fluid pump, a reversible fluid motor, a flow regulating valve for controlling the speed of the motor comprising an adjustable throttle and a pressure compensating valve responsive to the pressure drop across the throttle for maintaining a regulated flow of fluid through the flow regulating valve, said compensating valve being of the type that is biased to the open position when flow through the flow regulating valve ceases, control valve means for reversing the directional movement of the motor including means effectively stopping and restarting the motor, fluid flow through the flow regulating valve being interrupted when the motor is stopped, and a hydraulically operated fluid ejection cylinder injecting a flow of pressure fluid through the flow regulating valve before the motor is restarted after stopping the same.

3. In a hydraulic power transmission system the combination of a fluid pump, a fluid motor, a flow regulating valve connected to the motor for controlling the speed thereof comprising an adjustable throttle and a pressure compensating valve in series therewith assuming various regulating positions in response to the pressure drop across the throttle for maintaining the pressure drop constant and the flow through the throttle regulated, said compensating valve being biased to a fully open position during interruption of fluid flow through the flow regulating valve, means effecting stopping and restarting of the motor thereby respectively causing an interruption and resumption of fluid flow through the flow regulating valve, a hydraulically operated fluid ejection cylinder for injecting a flow of fluid through the flow regulating valve and means causing operation of the fluid ejection cylinder and placing the compensating valve in a flow regulating position before restarting the motor.

4. In a hydraulic power transmission system the combination of a fluid pump, a reversible fluid motor, a flow regulating valve connected to one end of the motor for controlling the speed in one direction thereof comprising an adjustable throttle and a pressure compensating valve in series therewith assuming various regulating positions in response to the pressure drop across the throttle for maintaining the pressure drop constant and the flow through the throttle regulated, said compensating valve being biased to a fully open position during interruption of fluid flow through the flow regulating valve, control means operable for reversing the directional movement of the motor and for stopping and resuming a controlled speed movement thereof, and a hydraulically operated fluid ejection cylinder connected to the flow regulating valve and to the flow regulated end of the motor for injecting a flow of pressure fluid through the flow regulating valve and towards the flow regulated end of the motor before the motor is restarted in a controlled speed directional movement.

5. In a hydraulic power transmission system the combination of a fluid pump, a reversible fluid motor, a flow regulating valve connected to one end of the motor for controlling the speed of the motor in one direction thereof comprising an adjustable throttle and a pressure compensating valve responsive to the pressure drop across the throttle for maintaining a regulated flow of fluid through the flow regulating valve, said compensating valve being of the type that is biased to the open position when flow through the flow regulating valve ceases, control means operable for reversing the directional movement of the motor, for stopping the motor during a directional movement thereof thereby interrupting fluid flow through the flow regulating valve and for resuming the directional movement after stopping the same, hydraulically operated means forming a source of pressure fluid connected to the flow regulating valve and to the flow regulated end of the motor, and means effective upon operation of the control means for resuming a controlled speed directional movement of the motor after stopping the same for causing operation of the hydraulically operated means thereby injecting a flow of pressure fluid through the flow regulating valve and reversing the directional movement of the motor before the controlled speed directional movement of the motor is resumed.

6. In a hydraulic power transmission system the combination of a fluid pump, a fluid motor, a flow regulating valve connected to the motor controlling the speed thereof comprising an adjustable throttle and a pressure compensating valve assuming various regulating positions in response to the pressure drop across the throttle thereby maintaining the pressure drop thereacross constant and the flow through the flow regulating valve regulated, said compensating valve being of the type that is biased to an open position when flow through the flow regulating valve is interrupted, means stopping the motor thereby interrupting fluid flow through the flow regulating valve, means injecting a flow of pressure fluid through the flow regulating valve, and means restarting the motor after the compensating valve assumes a regulating position.

7. In a hydraulic power transmission system the combination of a fluid pump, a reversible fluid motor, a flow regulating valve connected to one end of the motor and controlling the speed thereof in one direction comprising an adjustable throttle and a pressure compensating valve assuming various regulating positions in response to the pressure drop across the throttle thereby maintaining the pressure drop thereacross constant and the flow through the flow regulating valve regulated, said compensating valve being of the type that is biased to an open position when flow through the flow regulating valve is interrupted, means reversing the directional movement of the motor, means stopping the motor during a controlled speed movement thereof thereby interrupting fluid flow through the flow regulating valve, means injecting a flow of pressure fluid through the flow regulating valve, and means restarting the motor in the controlled speed movement after the compensating valve assumes a regulating position.

8. In a hydraulic power transmission system the combination of a fluid pump, a fluid motor, a flow regulating valve connected to the motor controlling the speed thereof comprising an adjustable throttle and a pressure compensating valve assuming various regulating positions in response to the pressure drop across the throttle thereby maintaining the pressure drop thereacross constant and the flow through the flow regulating valve regulated, said compensating valve being of the type that is biased to an open position when flow through the flow regulating valve is interrupted, means stopping the motor thereby interrupting fluid flow through the flow regulating valve, means injecting a flow of pressure fluid through the flow regulating valve, and slightly reversing the directional movement of the motor, and means restarting the motor after the compensating valve assumes a regulating position.

9. In a hydraulic power transmission system the combination of a fluid pump, a fluid motor, a flow regulating valve connected to the motor controlling the speed thereof comprising an adjustable throttle and a pressure compensating valve assuming various regulating positions in response to the pressure drop across the throttle thereby maintaining the pressure drop thereacross constant and the flow through the flow regulating valve regulated, said compensating valve being of the type that is biased to an open position when flow through the flow regulating valve in interrupted, means stopping the motor thereby interrupting fluid flow through the flow regulating valve, means injecting a flow of pressure fluid through the flow regulating valve, and to the flow regulating valve end of the motor, and means restarting the motor after the compensating valve assumes a regulating position.

RAYMOND B. PETTIBONE.

REFERENCES CITED

The following references are of record in the file of this patent:

UNITED STATES PATENTS

| Number | Name | Date |
|---|---|---|
| 2,328,979 | Herman et al. | Sept. 7, 1943 |
| 2,328,980 | Herman et al. | Sept. 7, 1943 |